Patented June 9, 1953

2,641,569

UNITED STATES PATENT OFFICE 2,641,569

WAX REFINING PROCESS

Willem Martin Mazee and Anna Barta Swart, Amsterdam, Netherlands, assignors to Shell Development Company, Emeryville, Calif., a corporation of Delaware No Drawing. Application July 21, 1952, Serial No. 300,124. In the Netherlands July 26, 1951

7 Claims. (Cl. 196—20)

This invention relates to a method of treating paraffin wax, particularly to separate therefrom undesirable components in a liquid state, as by sweating.

Wax sweating is one of the oldest processes in the petroleum industry and is employed to separate oil, isoparaffins and other relatively low-melting, undesirable constituents from crude paraffin wax (slack wax), in order to prepare purified paraffin wax consisting wholly or principally of normal paraffin hydrocarbons.

The crude paraffin wax subjected to the sweating process usually, though not necessarily, comes from filter presses, where a large part of the oil originally present in the crude paraffin wax is removed.

Generally, the crude wax is melted, poured into pans or trays with perforated bottoms and cooled there until the paraffin wax has become a solid cake. This cake is then gradually reheated, so that a liquid separates off which contains oil and low melting isoparaffins or other materials, the presence of which is undesirable in the purified paraffin wax; in addition, a quantity of the normal paraffin waxes desired in the end product is usually found in this liquid. The sweating, or fractional melting, as it really is, is stopped at the point when the wax is free from oil or, alternatively, when a sample drawn from the sweated wax shows that the wax has reached the melting point desired.

It should be noted here that the quality of the end product is better according as the oil content and the content of isoparaffins or relatively low melting constituents is smaller; furthermore, the liquid flowing off should contain as few suitable normal paraffin hydrocarbons as possible. For certain qualities of paraffin wax—so-called paper-quality paraffin wax—the minimum melting point of the normal paraffin waxes, which are permitted in the end-product, is often set at about 40° C.

There are great disadvantages attached to the sweating process as at present applied in practice, for in this sweating process a substantial part of the suitable normal paraffin waxes end up in the sweated-out liquid phase. As a result of this, large quantities of this liquid phase have to be recirculated or retreated in order that a sufficient, economical yield of the suitable paraffin waxes is obtained; this means that the equipment for carrying out the process is large and expensive and the process itself is relatively costly. In order to obtain a final product with a low isoparaffin content it is necessary to oversweat the cake very far and in connection therewith to apply an intensive recirculation, since otherwise the final product will contain a comparatively large amount of isoparaffins. For various applications, such as in the paper industry, the isoparaffin content of a paraffin wax should be low. A further disadvantage connected with the presently employed sweating processes is the long period of time required for sweating the wax. Furthermore, in the known sweating processes, it is virtually only possible to sweat a paraffin wax with a relatively wide boiling range. If it is desired to prepare lubricating oils with a narrow boiling range, paraffin wax with a narrow boiling range will also be obtained; this paraffin wax cannot, however, be effectively sweated according to the presently known processes.

In the known sweating processes heat is supplied directly or indirectly to the wax cake by means of warm water, warm air, or steam as by heating tubes imbedded in the wax. These tubes are present in the trays in which lie the wax cakes to be treated. Sometimes the wax cakes are placed in a chamber or tunnel which is heated throughout to the sweating temperatures required.

It is an object of this invention to provide a sweating process whereby a higher yield than heretofore possible of the normal waxes may be obtained. It is a further object of this invention to provide a process wherein the purity of the final product, especially with regard to the low content of low melting isoparaffins, is greater than is obtained in known sweating processes. It is an additional object of this invention to provide a sweating process utilizing a set of carefully controlled conditions to obtain the maximum purity and yield of wax.

Now, in accordance with the present invention, it has been found that the rate of sweating and yield of pure wax product is substantially improved by a control of temperature change rate, and more particularly a control of the mechanical pressure to be applied on the wax cake during sweating. More specifically, it has now been found that if the wax cake is heated at a rate between about 0.025° and 0.075° F. per minute within the temperature range from about 90° to about 150° F. while maintaining a mechanical pressure on the wax cake of between about 0.3 and about 15 pounds per square inch gauge the resulting sweated wax has a higher degree of purity not otherwise attainable during even extended sweating periods.

In carrying out the present process, utilizing the described improvements, the possibility of channeling between the individual wax crystals is substantially avoided. Moreover, the maintenance of a critically limited pressure on the cake is such that the skeleton formed by the individual wax crystals is substantially maintained without being crushed by excessive pressure. In the event that excessive pressure is employed the wax skeleton collapses, thereby trapping oil or low melting isoparaffin waxes which are more desirably eliminated during the sweating period. If, on the other hand, no pressure other than normal atmospheric pressure is employed, the original pore volume is increased substantially by the voids created during removal of sweated fractions. By the term "original pore volume" is meant the pore volume occupied by non-crystalline hydrocarbons at the initial temperature of sweating, that is, the volume of the liquid constituents present in the paraffin wax, constituting oil and substances dissolved therein. It will be understood that as low melting wax fractions are sweated from the wax cake the pore volume will increase unless suitable steps are taken to maintain the original pore volume. By "maintaining the original pore volume" is meant the act of controlling the original pore volume to within about 10% of that originally found in the cake at the commencement of sweating. In other words, the pore volume is maintained so as to be either increased or decreased by not more than about 10% of the original space, by a controlled compression of the wax cake, balancing the increase in the pore volume to within 10% of the original pore volume.

In maintaining the original pore volume within this relatively narrow limit mechanical pressure is applied to the cake, either in the form of a mechanical ram or alternatively by means of a solvent for the non-waxy fractions in direct contact with the paraffin wax. In this latter case this may comprise low molecular weight aliphatic alcohols such as butanol (or other monohydric alcohols having from 1 to 6 carbon atoms per molecule) which act at the working temperature as a solvent for the constituents to be removed from the paraffin wax but which have little or no such effect on the solid paraffin wax. Low molecular weight ketones such as methyl ethyl ketone, methyl isopropyl ketone, methyl isobutyl ketone, etc. may be used.

Sweating is preferably carried out as suggested hereinbefore in a vessel with a perforated bottom such as pan type screens. These latter vessels may be fitted with a ram to be employed as the pressure means either alone or together with a liquid such as that referred to above.

The success of the present process depends not only upon the maintenance of the original pore volume by means of restricting pressure to a critically limited range, but also upon raising the temperature of the wax cake during sweating at a rate which is relatively critically narrow. As stated hereinbefore, this rate of heating the cake during the sweating should be between about 0.025° and 0.075° F. per minute. Preferably the rate of heating is maintained between about 0.04° and 0.06° F. per minute. Still more preferably this rate of heating is utilized in conjunction with a preferred pressure on the cake of between about 1 and about 10 pounds per square inch. Optimum results are obtained if the original pore volume is varied by not more than about 5%.

Sweating normally occurs at temperatures between about 90° and 150° F., but it will be recognized by experts in the art that the precise temperature will vary with the identity of the wax to be sweated. Normally, however, sweating occurs at temperatures of from about 100° to about 135° F. In carrying out the improved sweating process according to the present invention the original pore volume is maintained by the above described means until at least about 90% of the constituents to be sweated have been removed from the cake. At that time or thereafter pressure may be increased if desired so as to crush the wax skeleton to its minimum volume for storage convenience or more efficient handling. Higher purity is obtained, however, if the critical pressure range is maintained until at least 95% of the constituents to be sweated have been removed from the wax cake.

As the examples given hereinafter show, the combination of the critically limited process conditions described above cause a substantial increase in the yield of desirable paraffin wax and a substantial decrease in the oil content of the final product. Conversely, it will be found that the sweated constituents contain a correspondingly small amount of desirable paraffin wax constituents.

In carrying out the process of the present invention the following steps are desirable: The crude wax is melted and poured in the usual manner into a tray having a perforated bottom. This charge is then cooled, preferably slowly, until crystallization is completed. Thereafter it is desirable, although not necessary, to continue cooling at a more rapid rate, since this subsequent rate of cooling renders the wax cake more permeable. It has been found that at certain temperatures the normal paraffins assume a second crystalline form. For various paraffins this transition temperature generally varies. Thus, in commercial operations wherein a mixture of paraffin waxes is sweated, one has to deal with a temperature range within which the change of crystalline form occurs. Until the point of transition is reached it is advisable that cooling take place slowly. Thereafter, however, it is preferred to cool the wax quickly. By cooling slowly to the point of transition, i. e., until crystallization has just finished, complete or almost complete and close packed crystallization takes place of those components which form the solid phase. This solid phase constitutes the skeleton of the sweated wax cake. Due to the rapid cooling subsequent to the slow cooling during the transition range, many minute cracks occur in the crystallized mass causing it to become more permeable to the sweated oils and low melting waxes which are removed thereafter.

When cooling has been carried out to the point at which a substantially completely solid mass has been formed, heat and pressure are applied to the cake in accordance with the conditions described hereinbefore, thereby heating the wax at a rate between about 0.025° and about 0.075° F. per minute within the temperature range of about 90° and about 150° F. while maintaining the pressure between about 0.3 and about 15 pounds per square inch, so as to substantially maintain the original pore volume of the cake. Under these conditions sweating takes place at a relatively rapid rate compared with older sweating processes so as to be complete in a matter of about 2 to 15 hours and usually between the range of about 6 to 9 hours. Normally, sweating by older procedures must be carried out for extended periods of about 24 hours or more.

Choice of the best way of raising the temperature of the cake is influenced by the kind of paraffin wax to be sweated. If the paraffin wax has a narrow boiling range, the temperature is very gradually increased, either continuously or stepwise until the oil has completely or almost completely been separated. The temperature can then be allowed to increase at a slightly quicker rate until the low melting isoparaffins, which have so far remained solid, begin to melt. As soon as this happens, the temperature is allowed to rise more slowly to the completion of the sweating period. The remainder of the cake forms the preferential end-product which consists almost exclusively of normal paraffin waxes and relatively high melting isoparaffins with minor amounts of naphthenes. This can be removed in known ways from the trays, such as by melting.

If the paraffin wax has a wide boiling range, it is preferable to allow the temperature from beginning to end of the treatment to increase at a relatively uniform rate, preferably slowly throughout the entire sweating period.

The examples which follow illustrate the advantages to be gained by the use of the conditions described hereinbefore as constituting the limits of the present invention.

*Example I*

The process according to the invention was compared to the existing method of sweating, in which pressure is not applied. A Venezuelan paraffin wax with an oil content of 16% by weight and an isoparaffin content of about 25% by weight served as base material. This paraffin wax was subjected to a sweating treatment lasting 9¼ hours, during which the temperature was raised from 98° F. to 131° F. The paraffin wax was contained in a vessel with a perforated bottom, and the pressure was exerted by means of a ram fitting tightly in the vessel.

The results were as follows:

| | No pressure on the paraffin wax cake | Pressure of 1⅓ lb./in.² on the paraffin wax cake |
|---|---|---|
| Yield of paraffin wax in percent (wt.) | 36 | 49 |
| Oil content of the sweated paraffin wax in percent (wt.) | 5 | 0.95 |

The melting point of the paraffin wax obtained in the sweating process according to the invention was 59° C.

By using the existing process no suitable finished product could be obtained in the stated time, while by working according to the invention a high quality paraffin wax was prepared.

If the initial paraffin wax is pressed at the indicated pressure and at room temperature, no oil can be removed.

*Example II*

Similar experiments were carried out using as a base an Indonesian paraffin wax (oil content 18% by weight, isoparaffin content about 12% by weight), in which the temperature was raised from 115° to 133° F. The sweating process lasted 7¾ hours.

At a pressure of 1⅓ lb./in.² on the paraffin wax cake, 63% by weight of paraffin wax with an oil content of 1.2% by weight was obtained. Without the application of pressure these figures were 60% by weight and 2.5% by weight respectively.

*Example III*

An Indonesian paraffin wax with an oil content of 17.8% by weight, and an isoparaffin content of about 14% by weight was subjected to a sweating treatment for 8 hours, during which the temperature was raised from 97° to 121° F. The paraffin wax was contained in a vessel with a perforated bottom and pressure was exerted by means of a ram fitting tightly in the vessel. The results were as follows:

| | No pressure on the paraffin wax cake | Pressure of 7 lb./in.² on the paraffin wax cake |
|---|---|---|
| Yield of paraffin wax in percent (wt.) | 62 | 69 |
| Oil content of the sweated paraffin wax in percent (wt.) | 2.0 | 0.58 |
| Melting point of the sweated paraffin wax °C | | 52 |

We claim as our invention:

1. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton being associated with an original pore volume, the latter being initially occupied by liquid constituents at the commencement of sweating, and raising the temperature of said cake at a rate between about 0.025° and about 0.075° F. per minute within a temperature range between about 90° and about 150° F. while maintaining a mechanical pressure on the wax cake of between about 0.3 and about 15 pounds per square inch, whereby the original pore volume of the wax cake is varied by no more than about 10% until at least 90% of the sweated constituents are removed from the cake.

2. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton being associated with an original pore volume, the latter being intitially occupied by liquid constituents at the commencement of sweating, and raising the temperature of said cake at a rate between about 0.04° and about 0.06° F. per minute within a temperature range between about 90 and about 150° F. while maintaining a mechanical pressure on the wax cake of between about 0.3 and about 15 pounds per square inch, whereby the original pore volume of the wax cake is varied by no more than about 10% until at least 90% of the sweated constituents are removed from the cake.

3. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton having an original pore volume, the latter being initially occupied by liquid constituents at the commencement of sweating, and raising the temperature of said cake at a rate between about 0.025° and about 0.075° F. per minute within a temperature range between about 90° and about 150° F. while maintaining a mechanical pressure on the wax cake of between about 1 and about 10 pounds per square inch, whereby the original pore volume of the wax cake is varied by no more than about 10% until at least 90% of the sweated constituents are removed from the cake.

4. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton having an original pore volume, the latter being initially occupied by liquid constituents at the commencement of sweating, and raising the temperature of said cake at a rate between about 0.025° and about 0.075° F. per minute within a temperature range between about 100° and about 135° F. while maintaining a mechanical pressure on the wax cake of between about 0.3 and about 15 pounds per square inch, whereby the original pore volume of the wax cake is varied by no more than about 10% until at least 90% of the sweated constituents are removed from the cake.

5. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton having an original pore volume, the latter being initially occupied by liquid constituents at the commencement of sweating, and raising the temperature of said cake at a rate between about 0.025° and about 0.075° F. per minute within a temperature range between about 90° and about 150° F. while maintaining a mechanical pressure on the wax cake of between about 0.3 and about 15 pounds per square inch, whereby the original pore volume of the wax cake is varied by no more than about 5% until at least 95% of the sweated constituents are removed from the cake.

6. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton having an original pore volume, the latter being initially occupied by liquid constituents at the commencement of sweating, and raising the temperature of said cake at a rate between about 0.025° and about 0.075° F. per minute within a temperature range between about 90° and about 150° F. while maintaining a mechanical ram on the wax cake with a pressure between about 0.3 and about 15 pounds per square inch, whereby the original pore volume of the wax cake is varied by no more than about 10% until at least 90% of the sweated constituents are removed from the cake.

7. In a method of sweating a predominantly paraffin wax to separate therefrom undesirable constituents in the liquid phase, the steps comprising preparing the wax cake for sweating by cooling a molten paraffin wax in a perforated receptacle to a temperature at which a solid wax cake is formed, said solid comprising a wax skeleton having an original pore volume, the latter being initially occupied by liquid constituents at the commencement of sweating, and raising the temperature of said cake at a rate between about 0.025° and about 0.075° F. per minute within a temperature range between about 90° and about 150° F. while maintaining a liquid pressure on the wax cake of between about 0.3 and about 15 pounds per square inch, whereby the original pore volume of the wax cake is varied by no more than about 10% until at least 90% of the sweated constituents are removed from the cake, said liquid being substantially a nonsolvent for wax constituents retained in the wax cake and being a solvent for the sweated constituents to be removed from said cake under the temperature and pressure conditions of the sweating operation.

WILLEM MARTIN MAZEE.
ANNA BARTA SWART.

References Cited in the file of this patent

UNITED STATES PATENTS

| Number | Name | Date |
| --- | --- | --- |
| 1,636,730 | Amdursky | July 26, 1927 |
| 2,230,079 | Hanson et al. | July 28, 1941 |
| 2,305,024 | Moyer | Dec. 15, 1942 |